US005410946A

United States Patent [19]

Hoshi

[11] Patent Number: 5,410,946

[45] Date of Patent: May 2, 1995

[54] HYDRAULIC ACTUATOR

[75] Inventor: Hideo Hoshi, Nagoya, Japan

[73] Assignee: Mannesmann Rexroth GmbH, Lohr/Main, Germany

[21] Appl. No.: 964,014

[22] Filed: Oct. 21, 1992

[30] Foreign Application Priority Data

Oct. 28, 1991 [JP] Japan .................................. 3-335803

[51] Int. Cl.[6] .......................... B30B 1/08; F01B 7/10; F16J 15/18

[52] U.S. Cl. ........................................ 092/65; 92/75; 92/107; 92/165 PR; 72/417; 100/269 R

[58] Field of Search ........................ 92/61, 65, 75, 107, 92/112, 165 PR, 165 R, 166, 62; 72/350, 351, 417, 453.07; 100/269 R, 918

[56] References Cited

U.S. PATENT DOCUMENTS

| | | | |
|---|---|---|---|
| 11,349 | 8/1854 | Ellis | 92/165 R X |
| Re. 23,892 | 11/1954 | Macewka | 92/62 X |
| 676,667 | 6/1901 | Patten | 92/165 R X |
| 1,181,110 | 5/1916 | Carter | 92/65 X |
| 2,600,493 | 6/1952 | Farris | 92/75 X |
| 2,723,057 | 11/1955 | Golden | 92/75 X |
| 2,749,867 | 6/1956 | Engel | 72/351 X |
| 2,876,744 | 3/1959 | Yuhaniak | 92/65 X |
| 3,032,997 | 3/1962 | Mitton | 92/75 X |
| 4,125,009 | 11/1978 | Byrd et al. | 72/350 |
| 4,572,057 | 2/1986 | Wewerka | 92/165 PR |
| 4,779,443 | 10/1988 | Hoshi | 72/350 X |
| 4,796,454 | 1/1989 | Bulso, Jr. et al. | 72/350 |
| 4,984,509 | 1/1991 | Hoshi . | |

FOREIGN PATENT DOCUMENTS

| | | | |
|---|---|---|---|
| 0125552 | 11/1984 | European Pat. Off. . | |
| 2187449 | 1/1974 | France . | |
| 1145125 | 3/1963 | Germany . | |
| 136177 | 11/1978 | Japan | 92/75 |
| 63-76954 | 7/1988 | Japan . | |
| 1429226 | of 0000 | United Kingdom . | |
| 928260 | 6/1963 | United Kingdom . | |

*Primary Examiner*—Edward K. Look
*Assistant Examiner*—John Ryznic
*Attorney, Agent, or Firm*—Armstrong, Westerman, Hattori, McLeland & Naughton

[57] ABSTRACT

A hydraulic actuator including a single cylinder body which defined therein a pressure chamber in which a first piston with a piston rod and a second piston with a piston rod are independently movably inserted, a first working member secured to the first piston rod, a second working member secured to the second piston rod, and pressurized fluid inlet and outlet ports provided in the cylinder body to be connected to the pressure chamber.

32 Claims, 9 Drawing Sheets

HYDRAULIC ACTUATOR

BACKGROUND OF THE INVENTION

1. Field of the Invention

The present invention relates to a hydraulic actuator, and more precisely, it relates to a two-stage hydraulic actuator having a cylinder device in which two pistons are inserted.

2. Description of Related Art

In a conventional hydraulic actuator, a single piston is reciprocally moved in a cylinder. A multi-stage cylinder device is also known in which a main piston and an auxiliary piston are provided in a cylinder.

To continuously carry out a series of operations, it is usually necessary to provide a cylinder device array consisting of a plurality of cylinder devices which are successively actuated, thus resulting in a complex and expensive equipment.

The primary object of the present invention is to provide a hydraulic actuator including a single cylinder device which can perform a plurality of successive operations.

Another object of the present invention is to provide a simple hydraulic actuator in which no eccentric load is produced during the operation.

SUMMARY OF THE INVENTION

According to the present invention, there is provided a hydraulic actuator comprising a single cylinder body which defined therein a pressure chamber in which a first piston with a piston rod and a second piston with a piston rod are independently movably inserted, a first working member secured to the first piston rod, a second working member secured to the second piston rod, and pressurized fluid inlet and outlet ports provided in the cylinder body to be connected to the pressure chamber.

Preferably, the pressure chamber comprises first, second and third separate pressure chambers, so that the first and second pressure chambers are separated by the first piston, and the second and third pressure chambers are separated by the second piston.

Provision is also made to a fluid pipe which extends through the first piston to be connected to the second pressure chamber.

The pressure chamber can be either annular or circular in cross section.

Preferably, each of the first and second piston rods is comprised of a plurality of rod elements.

These rod elements can be circumferentially spaced at an equiangular distance.

According to another aspect of the present invention, there is provided a press machine comprising a hydraulic actuator which includes a single cylinder body which defined therein a pressure chamber in which a first piston wish a piston rod and a second piston with a piston rod are independently movably inserted, a first working member secured to the first piston rod, a second working member secured to the second piston rod, and pressurized fluid inlet and outlet ports provided in the cylinder body to be connected to the pressure chamber, and a knock-out cylinder device which includes a knock-out on which a workpiece to be pressed is located, and an auxiliary hydraulic cylinder having a piston which is slidably inserted therein, so that the knock out is connected to the auxiliary hydraulic cylinder.

BRIEF DESCRIPTION OF THE DRAWINGS

Below, a detailed explanation will be made of the present invention based on embodiments shown in the attached drawings, in which.

DESCRIPTION OF THE PREFERRED EMBODIMENT

Figure 1:
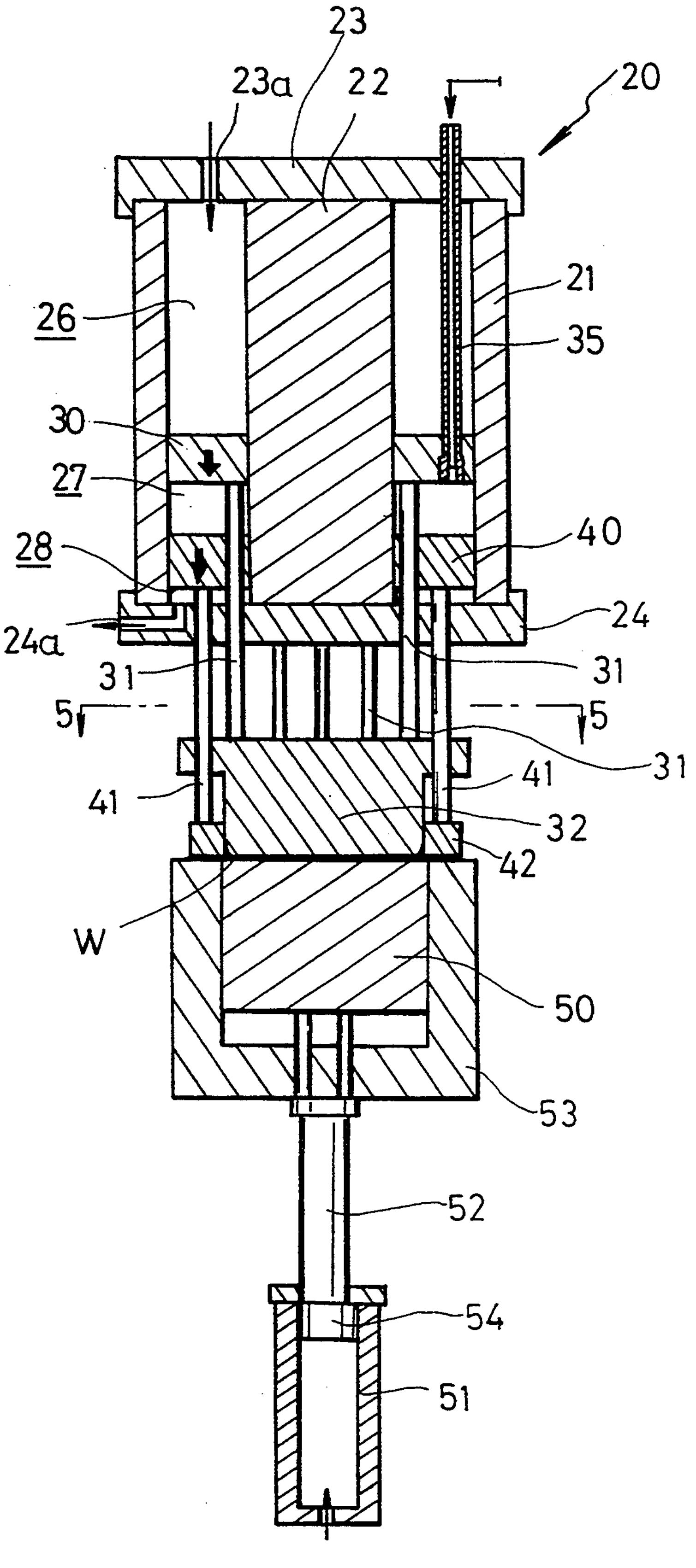
FIG. 1 is a longitudinal sectional view of a hydraulic press machine having a cylinder body which defines therein an annular pressure chamber, to which a first embodiment of the present invention is applied.

FIGS. 1 through 6 show a first embodiment of the present invention in which a hydraulic actuator is applied to a hydraulic press machine 20.

The press machine 20 includes a circular cylinder body 21, in which first and second pistons 30 and 40 are inserted. The first piston 30 has a piston rod 31 consisting of a plurality of rod elements concentrically arranged along a first imaginary circle. The piston rod 31 is provided on the front end (lower end) thereof with a punch 32 as a first working member. The first piston 30 is reciprocally moved in the cylinder body 21 in the axial direction thereof by a pressurized oil which is introduced in and discharged from the cylinder body 21 through first and second oil ports 23*a* and 24*a* formed in upper and lower end plates 23 and 24 of the cylinder body 21.

The second piston 40 has a piston rod 41 consisting of a plurality of rod elements concentrically arranged along a second imaginary circle larger than the first imaginary circle. The piston rod 41 is provided on the front end (lower end) thereof with a pressure pad (die cushion) 42 as a second working member. The second piston 40 is reciprocally moved in the cylinder body 21 in the axial direction thereof by a pressurized oil which is introduced in and discharged from the cylinder body 21 through an oil passage 35 which extends through the first piston 30 and the second oil port 24*a* of the end plate 24.

The oil passage 35 movably extends through the upper end plate 23 and is secured to the first piston 30 so as to move together with the first piston 30.

In the first embodiment illustrated in FIGS. 1 through 6, the cylinder body 21 is provided with a center column 22, so that first, second and third annular pressure chambers 26, 27 and 28 are defined in the cylinder body 21. The first and second pressure chambers 26 and 27 are separated by the first piston 30, and the second and third pressure chambers 27 and 28 are separated by the second piston 40.

Below the cylinder body 21 is provided a lower knock-out 50 which is slidably inserted in a housing (die) 5B and is connected to a piston rod 52 of a piston 54 which is slidably inserted in a knock-out cylinder (auxiliary hydraulic cylinder) 51.

Figure 5:
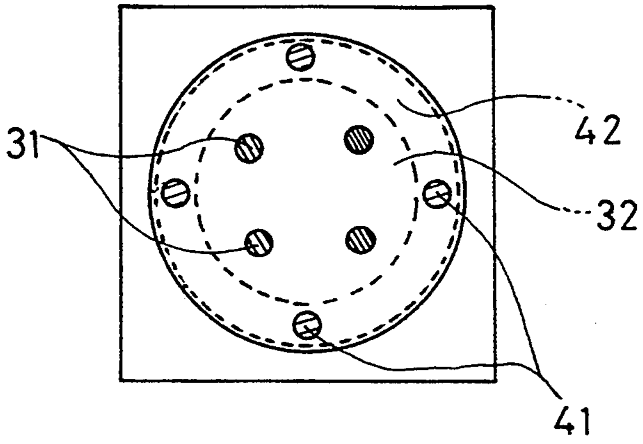
FIG. 5 is a cross sectional view taken along the line 5—5 in FIG. 1.
Figure 6:
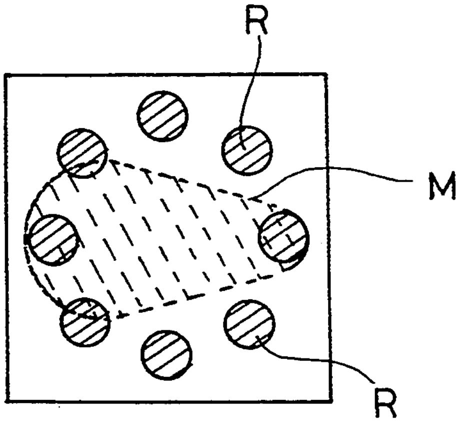
FIG. 6 is a plan view of another press die.

As mentioned above, a plurality of (e.g., four) rod elements of the first piston rod 31 of the first annular piston 30 are surrounded by a plurality of (e.g., four) rod elements of the second piston rod 41 of the second annular piston 40, as can be seen in FIG. 5. In a preferred arrangement, the rod elements R of the first piston rod 31 and/or the rod elements R of the second piston rod 41 are spaced from one another at an equiangular distance, as shown in FIG. 6, so that even an irregular shape of press die M which tends to receive an eccentric load can be substantially uniformly pressed for example at the peripheral edge thereof.

In the illustrated embodiment, the second working member (cushion pad) 42 is annular, so that the first working member (punch) 32 is slidably fitted in the second working member.

The hydraulic actuator as constructed above, according to the present invention operates as follows (particularly see FIGS. 1 through 43.

FIG. 1 shows a press contact position in which the second piston 40 is advanced (moved downward in FIG. 1) to bring the cushion pad 42 into press contact with a workpiece W located on the housing 53 and the knock-out 50 whose upper surface is flush with the upper surface of the housing 53 in the initial position.

In the press contact position shown in FIG. 1, a predetermined amount of pressurized fluid (e.g., pressurized oil) is introduced in advance in the second pressure chamber 27 through the oil passage (pipe) 35, and thereafter, a valve (not shown) provided in the oil passage 35 is closed. Thereafter, the pressurized fluid (e.g., pressurized oil) is introduced in the first pressure chamber 26 through the oil port 23*a*. As a result, both the first and second pistons 30 and 40 are advanced (moved downward in FIG. 1) while maintaining a constant distance between the first and second pistons 30 and 40 owing to the pressurized oil enclosed in the second pressure chamber 27. Namely, the pressurized oil enclosed in the second pressure chamber 27 serves as a rigid connector (fluid connector) to transmit the movement of the first piston 30 to the second piston 40.

The advance of the first and second pistons 30 and 40 causes the pressurized oil in the third pressure chamber 28 to be discharged therefrom through the oil port 24*a* formed in the lower end plate 24.

Figure 2:
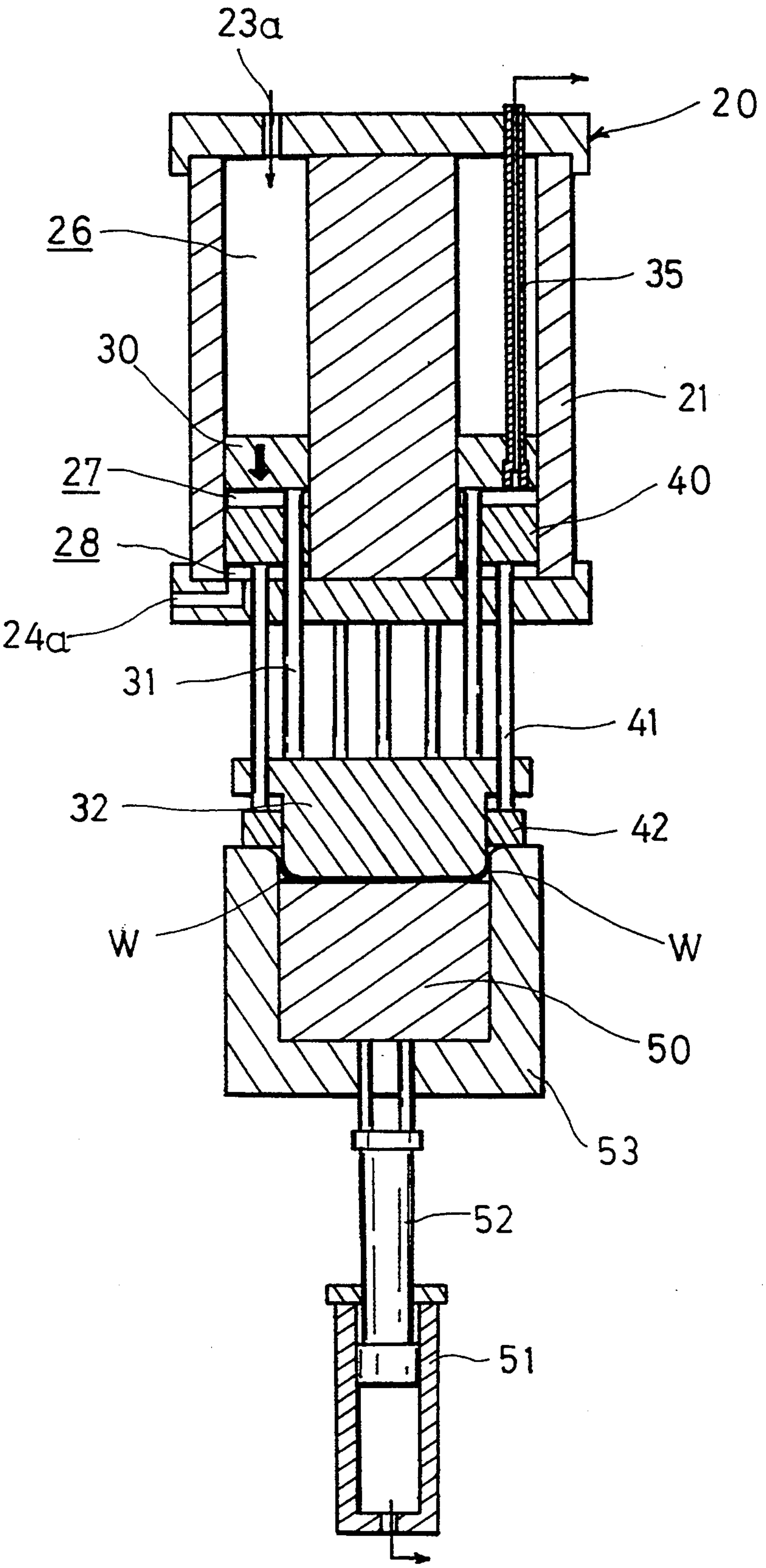
FIG. 2 is a longitudinal sectional view of a hydraulic press machine shown in FIG. 1, shown in a working position.

FIG. 2 shows a press (working) position in which the punch 32 is protruded by the first piston 30 to press (deform) the workpiece W into a desired shape.

To advance the first piston 30, the pressurized oil is introduced in the first pressure chamber 26 through the oil port 23*a* and the pressurized oil contained in the second pressure chamber 27 is gradually discharged therefrom through the oil passage (pipe) 35 while retaining a predetermined fluid pressure (i.e., adjustment of back pressure).

The adjustment of the back pressure during the discharge of the oil from the second pressure chamber 27 through the oil passage 35 while adjusting ensures a die cushion effect.

The workpiece W is pressed into a desired shape by the advance of the punch 32 caused by the movement of the first piston 30. To this end, the lower knock-out 50 is retracted (moved downward in FIG. 2).

Figure 3:
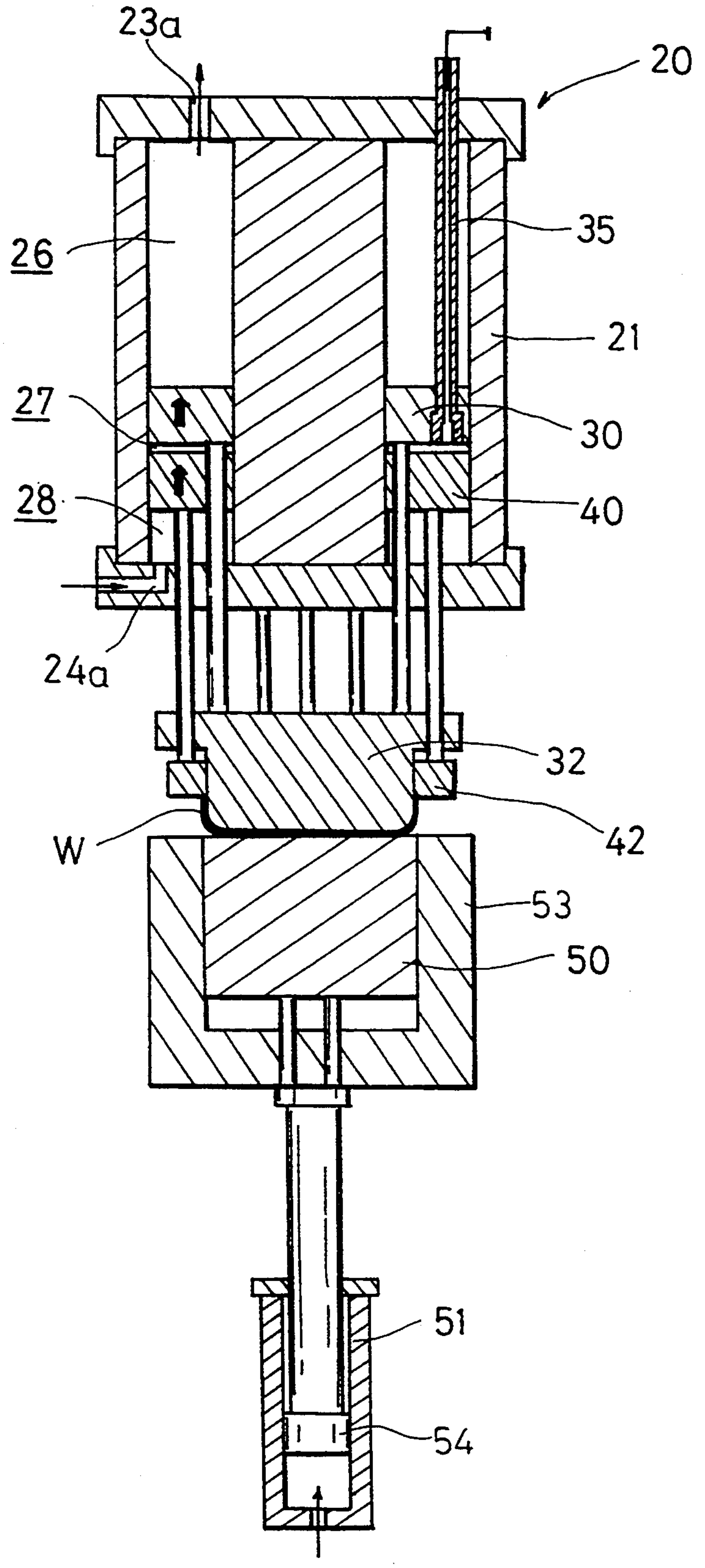
FIG. 3 is a longitudinal sectional view of a hydraulic press machine shown in FIG. 1, shown in a workpiece expelling position.

FIG. 3 shows a workpiece expelling position in which the valve (not shown) of the oil passage 35 is closed, so that the pressurized oil is enclosed in the second pressure chamber 27 to serve as a rigid connector, as mentioned above, and the pressurized oil is introduced in the third pressure chamber 28 through the oil port 24*a* to retract the second piston 40 together with the first piston 30. At the same time, the knock-out cylinder 51 is actuated to protrude the knock-out piston 54, and accordingly, the piston rod 52 thereof. Consequently, the pressed workpiece W is expelled by the knock-out 50 from the housing 53.

During the retraction (i.e., upward displacement) of the first piston 30, the pressurized oil in the first chamber 26 is discharged from the oil port 23*a*.

Figure 4:
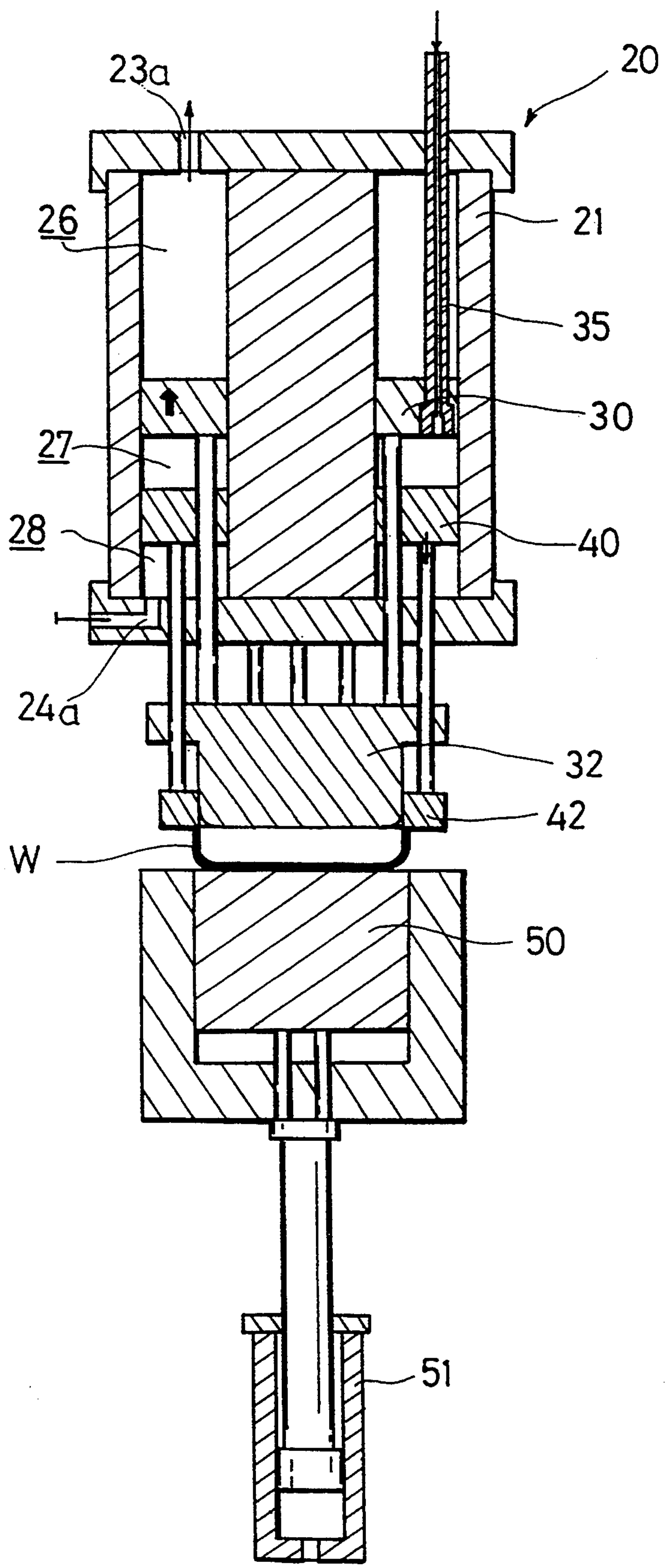
FIG. 4 is a longitudinal sectional view of a hydraulic press machine shown in FIG. 1, shown in a workpiece removing position.

FIG. 4 shows a workpiece removing position in which the pressed workpiece W is removed from the punch 32. In FIG. 4, a valve (not shown) provided in an oil passage connected to the third pressure chamber 28 through the oil port 24*a* is closed, and thereafter, the pressurized oil is introduced in the second pressure chamber 27 through the oil passage 35. As a result, the introduction of the pressurized oil in the second pressure chamber 27 causes only the first piston 30 to move upward in FIG. 4 without moving the second piston 40 since the pressure in the third pressure chamber 28 is kept constant by the closure of the valve.

During the upward movement of the first piston 30, the pressurized oil in the first pressure chamber 26 is discharged therefrom through the oil port 23*a*.

Consequently, the pressed workpiece W is removed from the punch 32 by the upward movement of the first piston 30.

FIGS. 7 through 11 show a second embodiment of the present invention.

The press machine 60 shown in FIGS. 7 through 11 has a cylinder body 61 having therein a circular pressure chamber consisting of first, second and third pressure chambers 66, 67 and 68. The second embodiment illustrated in FIGS. 7 through 11 is different from the first embodiment illustrated in FIGS. 1 through 6 only in the shape of the pressure chamber which is annular in the first embodiment and circular in the second embodiment, respectively. Namely, the cylinder body 61 has no center column 22 as shown in FIGS. 1 through 4.

The operation of the second embodiment is substantially identical to that of the first embodiment. Namely, the first piston 70 has a piston rod 71 secured thereto, which is provided on the front (lower) end thereof with a punch 72 serving as a first working member. The first piston 70 is reciprocally moved in the cylinder body 61 in the axial direction by the pressurized fluid (e.g., pressurized oil) introduced in and discharged from the pressure chamber through the oil ports 63*a* and 64*a* formed in the end plates 63 and 64, respectively.

The second piston 80 has a piston rod 81 secured thereto, which is provided, on the front (lower) end thereof with, a pressure pad 82 for die cushion as a second working member. The second piston 80 is reciprocally moved in the cylinder body 61 in the axial direction by the pressurized fluid (e.g., pressurized oil) introduced in and discharged from the second pressure chamber 67 through the oil passage (pipe) 75 which extends through the first piston 70 and the upper end plate 63.

Numeral 90 designates the lower knock-out, 91 the knock-out cylinder, 92 the piston rod, 93 the housing (die), 94 the piston, corresponding to those in the first embodiment shown in FIGS. 1 through 4, respectively.

Figure 7:
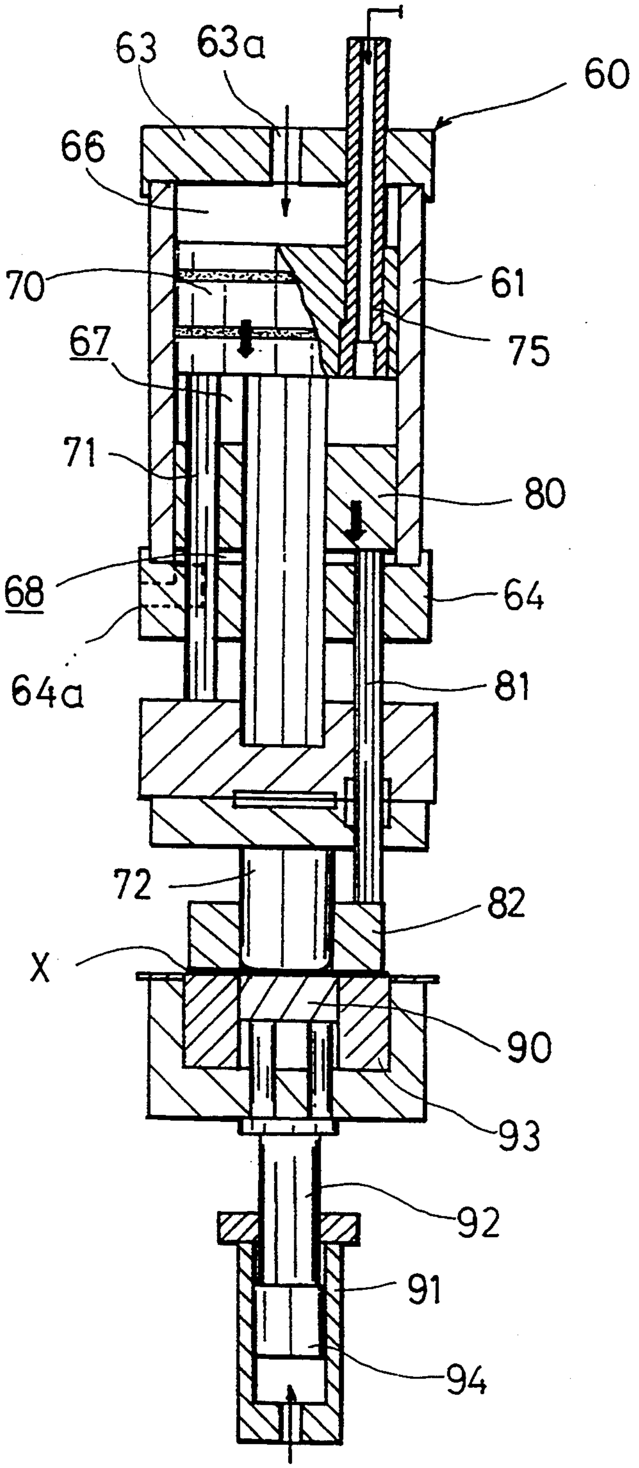
FIG. 7 is a longitudinal sectional view of a hydraulic press machine having a cylinder body which defines therein a circular pressure chamber, according to a second embodiment of the present invention.

FIG. 7 shows the press contact position corresponding to FIG. 1, in which the second piston 80 is advanced (moved downward), so that the cushion pad 82 comes into press contact with the workpiece X. Similarly to FIG. 1, in the press contact position shown in FIG. 7, a predetermined amount of pressurized fluid (e.g., pressurized oil) is introduced in advance in the second pressure chamber 67 through the oil passage (pipe) 75, and thereafter, a valve (not shown) provided in the oil passage 75 is closed. Thereafter, the pressurized fluid (e.g., pressurized oil) is introduced in the first pressure chamber 66 through the oil port 63*a*. As a result, both the first and second pistons 70 and 80 are advanced (moved downward in FIG. 7).

Figure 8:
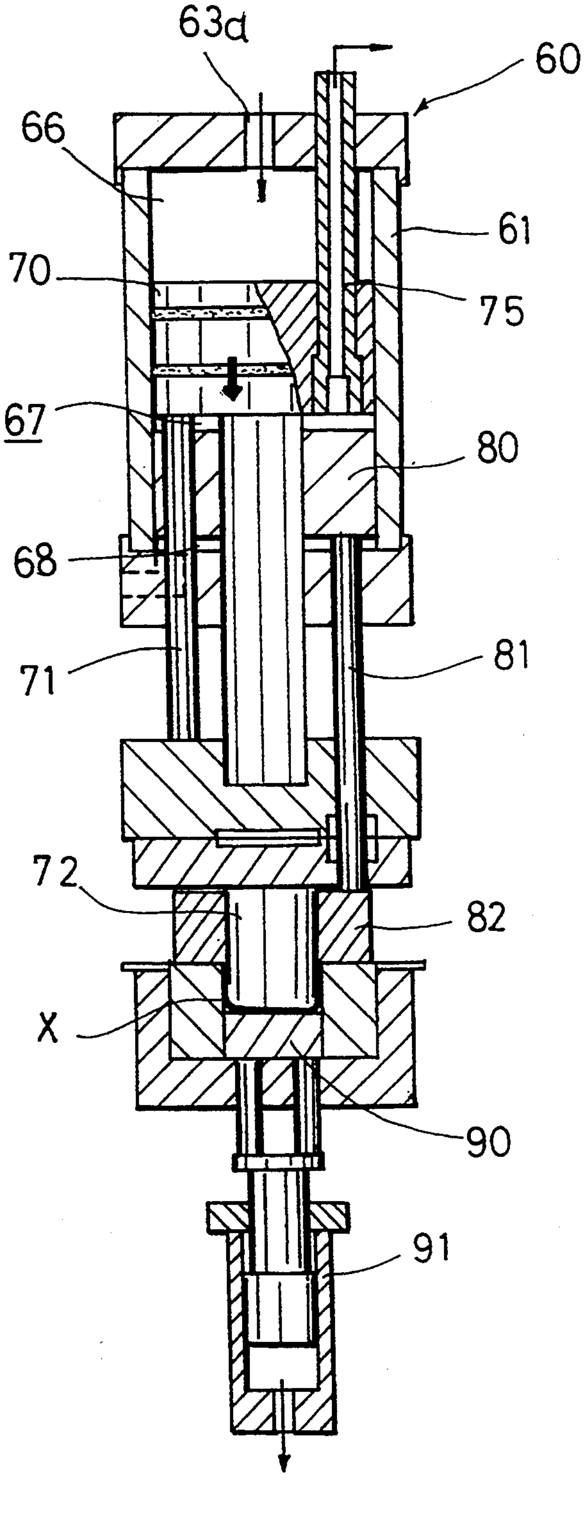
FIG. 8 is a longitudinal sectional view of a hydraulic press machine shown in FIG. 7, shown in a working position.

FIG. 8 shows a working position corresponding to FIG. 1, in which the punch 82 is protruded by the first piston 70 to press (deform) the workpiece X into a desired shape.

To advance the first piston 70, the pressurized oil is introduced in the first pressure chamber 66 through the oil port 63*a* and the pressurized oil contained in the second pressure chamber 67 is gradually discharged therefrom through the oil passage (pipe) 75 while retaining a predetermined fluid pressure (i.e., adjustment of back pressure).

Thus, the workpiece X is pressed into a desired shape by the advance of the punch 32 caused by the movement of the first piston 70. To this end, the lower knock-out 90 is retracted (moved downward in FIG. 8).

Figure 9:
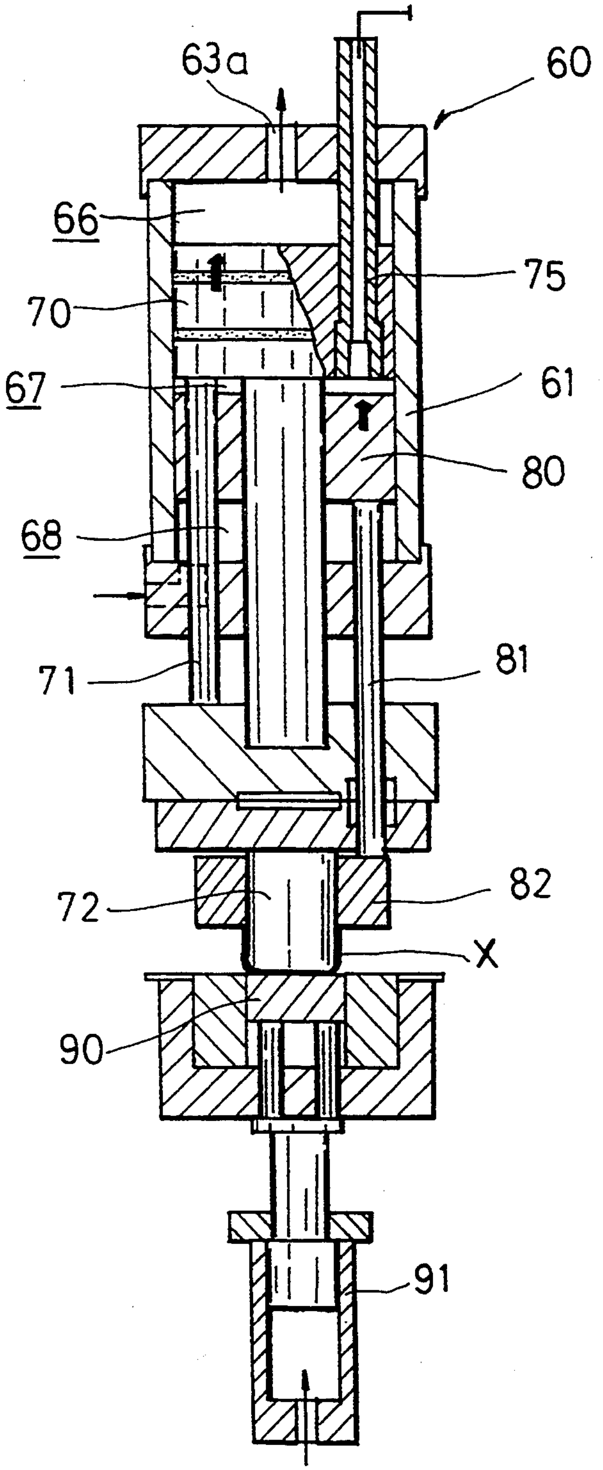
FIG. 9 is a longitudinal sectional view of a hydraulic press machine shown in FIG. 7, shown in a workpiece expelling position; and, FIG. 10 is a longitudinal sectional view of a hydraulic press machine shown in FIG. 7, shown in a workpiece removing position.

FIG. 9 shows a workpiece expelling position corresponding to FIG. 3, in which the valve (not shown) of the oil passage 75 is closed, so that the pressurized oil is enclosed in the second pressure chamber 67 to serve as a rigid connector, as mentioned above, and the pressurized oil is introduced in the third pressure chamber 68 through the oil port 64*a* to retract the second piston 80 together with the first piston 70. At the same time, the knock-out cylinder 91 is actuated to protrude the knock-out piston 94, and accordingly, the piston rod 92 thereof. Consequently, the pressed workpiece X is expelled by the knock-out 90 from the die 93.

During the retraction (i.e., upward displacement) of the first piston 70, the pressurized oil in the first chamber 66 is discharged from the oil port 63*a*.

Figure 10:
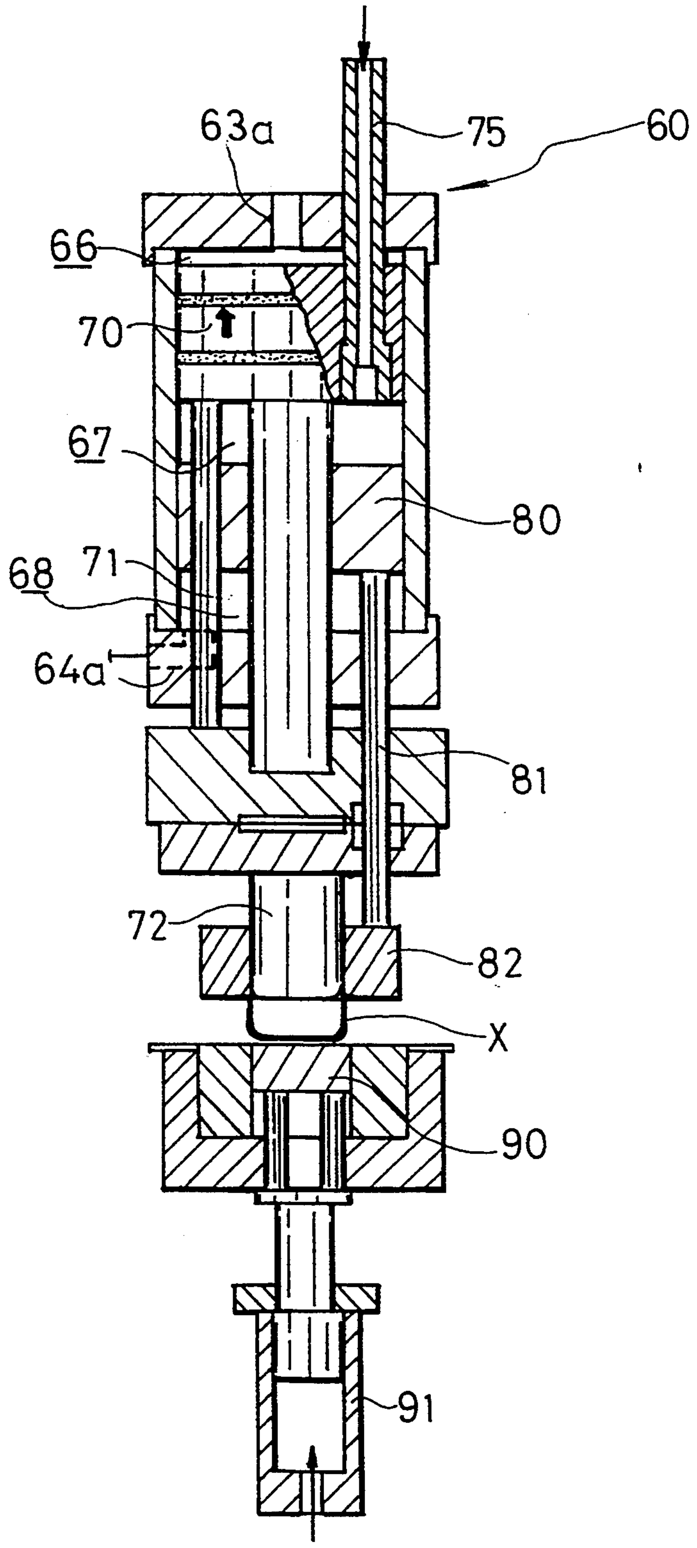

FIG. 10 shows a workpiece removing position in which the pressed workpiece X is removed from the punch 82. In FIG. 10, a valve (not shown) provided in an oil passage connected to the third pressure chamber 68 through the oil port 64*a* is closed, and thereafter, the pressurized oil is introduced in the second pressure chamber 67 through the oil passage 75. As a result, the introduction of the pressurized oil in the second pressure chamber 67 causes only the first piston 70 to move upward in FIG. 10 without moving the second piston 80 since the pressure in the third pressure chamber 68 is kept constant by the closure of the valve.

During the upward movement of the first piston 70, the pressurized oil in the first pressure chamber 66 is discharged therefrom through the oil port 63*a*.

Consequently, the pressed workpiece X is removed from the punch 82 by the upward movement of the first piston 70.

As can be seen from the foregoing, according to the present invention, since a plurality of successive operations can be carried out by a simple single actuator, the actuator not only requires a reduced installation space and a less energy consumption, but also makes it possible to realize an automated simple manufacturing line including an automatic conveyance of the workpieces.

Furthermore, the provision of a plurality of piston rods prevents occurrence of an eccentric load applied to the die and accordingly the workpiece, thus resulting in a high precision pressing.

What is claimed is:

1. A hydraulic press machine, comprising:
- a cylinder body;
- a pressure chamber in said cylinder body;
- a first piston with a piston rod and a second piston with a piston rod which are independently movably inserted in said pressure chamber;
- a first working member secured to the first piston rod;
- a second working member secured to the second piston rod;
- pressurized fluid inlet and outlet ports provided in the cylinder body to be connected with the pressure chamber;
- an opposing member located proximate said first working member such that a work piece can be pressed between said first working member and said opposing member; and
- wherein said first piston rod is comprised of a plurality of first rod elements.

2. A hydraulic press machine according to claim 1, wherein said pressure chamber comprises first, second and third separate pressure chambers, so that the first and second pressure chambers are separated by the first piston, and the second and third pressure chambers are separated by the second piston.

3. A hydraulic press machine according to claim 1, further comprising a fluid pipe which extends through the first piston to be connected to the second pressure chamber.

4. A hydraulic press machine according to claim 1, wherein said cylinder body has a central column, so that the pressure chamber is annular in cross section.

5. A hydraulic press machine according to claim 1, wherein said first piston rod is comprised of a plurality of first rod elements.

6. A hydraulic press machine according to claim 1, wherein said first rod elements are spaced at an equiangular distance along a first imaginary circle.

7. A hydraulic press machine according to claim 6, wherein said second piston rod is comprised of a plurality of second rod elements.

8. A hydraulic press machine according to claim 7, wherein said second rod elements are spaced at an equiangular distance along a second imaginary circle.

9. A hydraulic press machine according to claim 7, wherein said first rod elements are surrounded by the second rod elements as viewed in a plan view.

10. The hydraulic press machine according to claim 1, wherein said piston rod of said first piston extends through bore holes through said second piston.

11. The hydraulic press machine according to claim 10, wherein said piston rod of said second piston extends through bore holes in said first working member.

12. The hydraulic press machine according to claim 1, wherein said first piston rod includes a central rod element which is substantially greater in diameter than the remainder of said plurality of first rod elements.

13. The hydraulic press machine according to claim 12, wherein said pressure chamber has a circular cross section.

14. The hydraulic press machine according to claim 1, wherein said cylinder body has a center column therein such that said pressure chamber is annular in cross section, and wherein said plurality of first rod elements surround said center column.

15. The hydraulic press machine according to claim 1, wherein a pressure medium passage tube extends through an end of said cylinder body and through said first piston to a portion of said pressure chamber between said first and second pistons.

16. The hydraulic press machine according to claim 15, wherein said pressure medium passage tube slidingly extends through said end of said cylinder body so as to move along with movement of said first piston.

17. A press machine, comprising:

a hydraulic actuator which includes a single cylinder body which has defined therein a pressure chamber in which a first piston with a piston rod and a second piston with a piston rod are independently movably inserted, a first working member secured to the first piston rod, a second working member secured to the second piston rod, and pressurized fluid inlet and outlet ports provided in the cylinder body to be connected to the pressure chamber; and, a knock-out cylinder device which includes a knock-out on which a work piece to be pressed is located, and an auxiliary hydraulic cylinder having a piston which is slidably inserted therein, so that the knock-out is connected to the auxiliary hydraulic cylinder;

wherein said pressure chamber comprises first, second and third separate pressure chambers, so that the first and second pressure chambers are separated by the first piston, and the second and third pressure chambers are separated by the second piston; and wherein each of said first and second piston rod is comprised of a plurality of rod elements.

18. A hydraulic actuator according to claim 17, wherein said rod elements are circumferentially spaced at an equiangular distance.

19. A hydraulic actuator according to claim 18, wherein the rod elements of the first piston rod are surrounded by the rod elements of the second piston rod, as viewed in a plan view.

20. A hydraulic press machine, comprising:

a cylinder body;

a pressure chamber in said cylinder body;

a first piston with a piston rod and a second piston with a piston rod which are independently movably inserted in said pressure chamber;

a first working member secured to the first piston rod;

a second working member secured to the second piston rod;

pressurized fluid inlet and outlet ports provided in the cylinder body to be connected with the pressure chamber;

an opposing member located proximate said first working member such that a work piece can be pressed between said first working member and said opposing member;

wherein said first piston rod is comprised of a plurality of first rod elements; and wherein said second piston rod is comprised of a plurality of second rod elements.

21. The hydraulic press machine according to claim 20, wherein said first rod elements are surrounded by the second rod elements as viewed in a plan view.

22. The hydraulic press machine according to claim 20, wherein said plurality of second piston rod elements extend through bore holes in said first working member.

23. The hydraulic press machine according to claim 20, wherein said plurality of second piston rod elements extend through bore holes in said first working member.

24. The hydraulic press machine according to claim 20, wherein said first piston also includes a central piston rod which is surrounded by said plurality of first rod elements.

25. The hydraulic press machine according to claim 24, wherein said central piston rod is substantially greater in diameter than each of said plurality of first rod elements.

26. The hydraulic press machine according to claim 20, wherein said plurality of first piston rod elements extend parallel to one another and are arranged along a first circle, and wherein said plurality of second piston rod elements extend parallel to one another and are arranged along a second circle.

27. The hydraulic press machine according to claim 26, wherein the diameter of said second circle is greater than the diameter of said first circle.

28. The hydraulic press machine according to claim 26, wherein the diameter of said second circle is equal to the diameter of said first circle.

29. A hydraulic press machine, comprising:

a cylinder body;

a pressure chamber in said cylinder body;

a first piston with a piston rod and a second piston with a piston rod which are independently movably inserted in said pressure chamber;

a first working member secured to the first piston rod;

a second working member secured to the second piston rod;

pressurized fluid inlet and outlet ports provided in the cylinder body to be connected with the pressure chamber;

an opposing member located proximate said first working member such that a work piece can be pressed between said first working member and said opposing member;

wherein said first piston rod is comprised of a plurality of first rod elements;

wherein said first rod elements are spaced at an equiangular distance along a first imaginary circle;

wherein said second piston rod is comprised of a plurality of second rod elements;

wherein said second rod elements are spaced at an equiangular distance along a second imaginary circle; and wherein said first rod elements are surrounded by the second rod elements as viewed in a plan view.

30. A hydraulic actuator comprising a single cylinder body which has defined therein a pressure chamber in which a first piston with a piston rod and a second piston with a piston rod are independently movably inserted, a first working member secured to the first piston rod, a second working member secured to the second piston rod, and pressurized fluid inlet and outlet ports provided in the cylinder body to be connected with the pressure chamber; and wherein said first piston rod is comprised of a plurality of first rod elements;

wherein said first rod elements are spaced at an equiangular distance along a first imaginary circle;

wherein said second piston rod is comprised of a plurality of second rod elements; and wherein said first rod elements are surrounded by the second rod elements as viewed in a plan view.

31. A hydraulic press machine, comprising:

a cylinder body having a first end wall and a second end wall;

a first piston and a second piston inside said cylinder body;

a first pressure chamber being defined between said first end wall and said first piston, a second pressure chamber being defined between said first and second pistons, and a third pressure chamber being defined between said second piston and said second end wall;

said first piston having a piston rod and said second piston having a piston rod, and said first and second pistons being independently movable within said cylinder body;

a first working member secured to the first piston rod;

a second working member secured to the second piston rod;

an opposing member located proximate said first working member such that a work piece can be pressed between said first working member and said opposing member;

said second pressure chamber being in fluid communication with a fluid passage tube (35), wherein said fluid passage tube extends through said first end wall, then through said first chamber, then through said first piston to said second chamber.

32. The hydraulic press machine according to claim 31, wherein said fluid passage tube is substantially parallel to the moving direction of said first piston and along an located distal from a center of said first piston.

* * * * *